Feb. 20, 1968 J. M. CICCONE Re. 26,348

ENVELOPE COUNTER

Original Filed April 18, 1963 2 Sheets-Sheet 1

INVENTOR.
JACK M. CICCONE

BY

Nolte & Nolte
ATTORNEYS

ENVELOPE COUNTER

Original Filed April 18, 1963 2 Sheets-Sheet 2

INVENTOR.
JACK M. CICCONE

BY Nolte & Nolte
ATTORNEYS

United States Patent Office

Re. 26,348
Reissued Feb. 20, 1968

26,348
ENVELOPE COUNTER

Jack M. Ciccone, deceased, late of Westbury, N.Y., by Irene Ciccone, administrix, Westbury, N.Y., assignor to F. L. Smithe Machine Co., Inc., New York, N.Y., a corporation of New York Original No. 3,199,420, dated Aug. 10, 1965, Ser. No. 273,945, Apr. 18, 1963. Application for reissue Mar. 28, 1967, Ser. No. 651,058
1 Claim. (Cl. 93—93)

Matter enclosed in heavy brackets [ ] appears in the original patent but forms no part of this reissue specification; matter printed in italics indicates the additions made by reissue.

This invention relates, in general, to envelope making machines, and in particular to an improved system for automatically segregating a group of stacked envelopes into packs of predetermined number.

The present invention provides a means for accurately and automatically determining a preselected number of envelopes and distinguishing each group of such envelopes from the other. This invention is an improvement over previous systems, such as is illustrated in co-pending application Serial No. 103,473, filed April 17, 1961, *and now abandoned.* In that application a device for stacking finished envelopes in stacks of precise and predetermined number and banding each stack is provided. In the aforesaid application the banding mechanism is laterally offset from the line of envelope delivery coming from the preceding folding machine. In the device of that application a stack of envelopes of predetermined number is removed periodically from the direct feed line of the envelope machine and shifted laterally to an adjacent device which automatically bands each segregated pack of envelopes.

In the present invention lateral movement and subsequent banding is not desired. Rather, it is desired to feed a stack of envelopes in a direct line as in the prior art, and at the same time segregate the stacked envelopes in groups of predetermined number. Thus, a system is herein provided for so determining a preselected number and segregating each such number of envelopes from the other.

Accordingly, it is an object of this invention to provide an improved envelope stacking mechanism.

It is a further object of the present invention to provide an envelope stacking device which automatically segregates the stacked envelopes into packs of predetermined number.

It is another object of the invention to provide a system for counting envelopes as they are delivered by an envelope machine and off-setting selected envelopes at predetermined intervals.

Another object is to provide an improved envelope delivery mechanism which facilitates the subsequent manual banding of envelopes into packs of predetermined number.

Another object of the invention is to provide an improved envelope delivery mechanism which facilitates the accurate counting of the envelopes as they are placed into a shipping container by the machine operator.

The various features of novelty which characterize the invention are pointed out with particularity in the claim annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
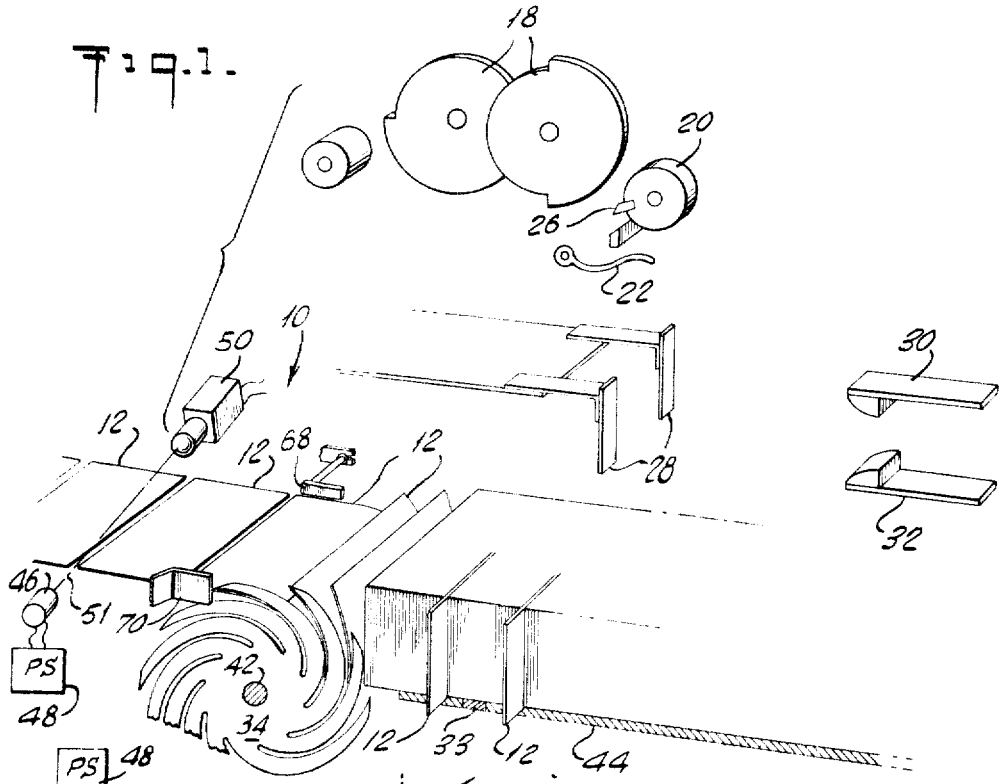
FIG. 1 is a diagrammatic perspective view of the present invention with a portion of the prior art in schematic form.

Referring to the drawings and in particular to FIG. 1, there is shown a portion of an envelope stacking mechanism 10, wherein envelopes 12 are carried by conveyor 14 from an envelope forming mechanism (not shown) to the envelope stacking mechanism.

In FIG. 1, there are shown schematically, laterally offset from the envelope stacking machine, selected portions of the banding mechanism of applicant's co-pending application Serial No. 103,473, mentioned hereinabove. In that application, mechanism partially illustrated at 16, removes preselected numbers of envelopes from the envelope stacking station and moves them, as a unit, laterally to an offset position. Feed cams 18, knife roller 20, and applicator arm 22 cooperate to move a wrapping band (not shown) and apply a spot of glue thereto at predetermined intervals. Knife 26 serves to severe the band at predetermined intervals. Pushers 28 serve to move the laterally transposed pack of envelopes and the severed band between the opposed band folding arms 30 and 32. A filler plate 33 allows for conversion of the stacking machine from the offset feed system to an inline delivery system as contemplated by the present invention.

In lieu of offsetting stacks of envelopes as in the device of application Serial No. 103,473, the present invention contemplates inline movement of the envelopes to the termination of the envelope stacking machine.

As in the prior art devices of this type, the envelopes 12 are fed between conveyor belts 14 and 14', which sandwich the envelopes therebetween to hold them securely in place, to the vicinity of aligned slotted stacker wheels 34, 36 and 38. Each slotted wheel includes a plurality of spirally extending fingers 40 which form slots in the periphery of the wheels. The slotted wheels 34, 36 and 38 are mounted on a shaft 42, which is rotated in precise timed relationship to the mechanism of the envelope forming machine. Drive chain 45 operatively connects shaft 42 with shaft 43, and drive chain 47, which also engages shaft 42, is connected to a drive mechanism (not shown). As each envelope is moved forward by the conveyor the envelope is slipped into a parallel set of slots formed by the extending fingers 40. After the envelope enters a slot, it is carried around on the wheels until the seal flap edge of the envelope strikes delivery table 44. Tabs 35, 37, 39 and 41 extend to within the radius of wheels 34, 36 and 38 to enable the table to receive the envelopes. Thus, it will be understood that as the slotted wheels rotate against the table 44, they bring the envelope 12 to a vertical position with its seal flap edge downwardly on the delivery table over which the now vertically stacked envelopes are moved to the succeeding section of the stacking apparatus (not shown).

Figure 2:
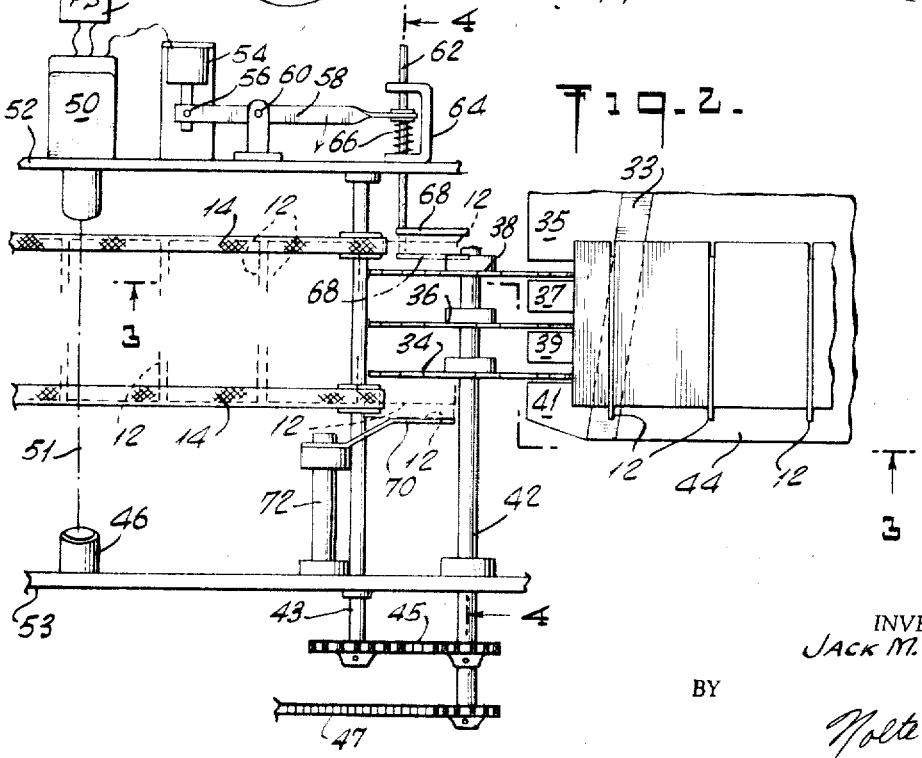
FIG. 2 is a plan view of the detecting and actuating device and a portion of the envelope stacking mechanism.
Figure 3:
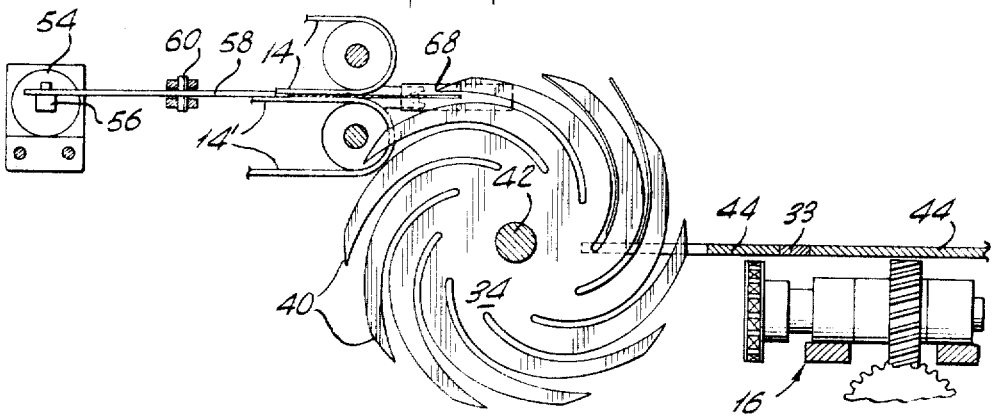
FIG. 3 is a vertical section taken along the lines 3—3 of FIG. 2.
Figure 4:
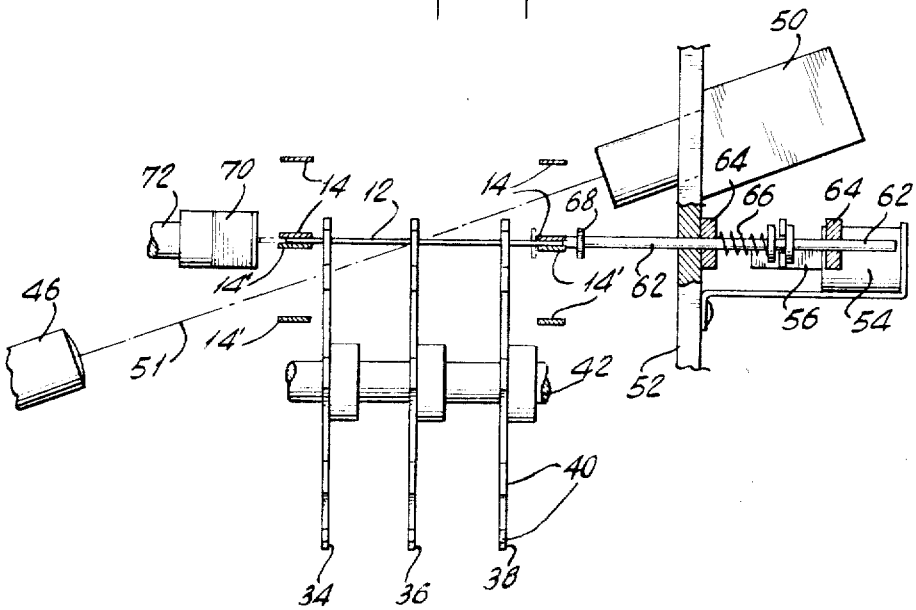
FIG. 4 is a vertical section taken along the line 4—4 of FIG. 2.

A radiant energy source 46, connected to a suitable power supply 48 is positioned just beneath the horizontal plane of envelopes 12 and aligned with a conventional detector and counter 50, whereby the detector is capable of sensing a beam of energy 51 transmitted by said energy source 46. Energy source 46 is suitably secured to supporting element 53. Conveyor belts 14 and 14' each include two sections spaced apart from each other, thereby providing an uninterrupted path for the beam of energy in the space between each envelope, as seen in FIGS. 2 and 4. Detector 50 is also electrically connected to power source 48. Supporting element 52 provides a foundation for the positioning and attachment thereto of detector 50.

As can be seen more clearly in FIG. 2, a solenoid 54 affixed to supporting element 52 includes a solenoid arm 56 rotatably attached to one end of yoke 58. Yoke 58, in turn, is rotatably mounted upon fulcrum 60 which is also secured to supporting element 52. The other end of yoke 58 is securely affixed to offset arm 62. A U-shaped bracket 64 is affixed to supporting element 52 and provides a support and guide for offset arm 62. A coil spring 66 affixed by one of its ends to arm 62 abuts one end of U-shaped bracket 64 in such a manner as to tend to bias offset arm 62 outwardly from the line of envelopes 12. To the end of offset arm 62 there is affixed offset bar 68, which is aligned parallel to the line of envelopes 12. Thus, when offset bar 68 is moved inwardly toward the line of envelopes 12, the offset bar 68 will engage any envelope in the position shown (FIG. 2), spaced apart from and parallel with bar 68, after the envelope has left the control of conveyor belts 14 and 14'. The offset bar will then move the envelope to the position indicated by the dotted lines (FIG. 2), against check bar 70 just as the envelope enters the slots formed by fingers 40. Check bar 70 is affixed to support element 72, which in turn is secured to supporting element 53.

It should be noted that a solely mechanical type of detector and counter may be employed in lieu of the electronic means embodied herein.

Turning now to the operation of the system encompassed by the present invention, as each envelope 12 cuts a beam of energy 51, the interruption is sensed by detector 50. After a predetermined number of interruptions by the passing envelopes has been sensed, detector 50 will trigger a signal which is transmitted to solenoid 54. Solenoid 54 is thereupon actuated by the signal to thereby pivot yoke 58 on fulcrum 60 in the direction indicated by the appropriate arrow. Thus it can be understood that the subsequent motion of offset bar 68 will push an envelope positioned adjacent plunger 68 in the direction of check bar 70. The envelope is then moved along in the conventional manner as described hereinabove by the slotted wheels and fingers 40 to a vertical position on table 44. However, the selected envelope engaged by offset bar 68 is now spaced outwardly from the normal line of envelopes to indicate to an operator that there is a predetermined number of envelopes between each of the offset outwardly extending envelopes.

It should be understood that the detector 50 is of the type that may be adjusted by means (not shown) to actuate solenoid 54 thereby providing for the segregation of any predetermined number of envelopes required for grouping by the operator.

Thus it will be seen that the present invention provides a system for grouping a predetermined number of envelopes and setting them off so that the operator may be able to segregate each of such groups of envelopes for subsequent manual banding thereof into packs of envelopes of predetermined number, or to facilitate the accurate counting of the envelopes as they are placed in a shipping container by the machine operator. The system anticipated by the present invention is fully automated and does not require the attention of an operator once the detector has been set for sensing the desired number of envelopes.

While a specific embodiment of the invention has been shown and described in detail to illustrate the application of the invention principles, it will be understood that the invention may be embodied otherwise without departing from such principles.

What I desire to cover by Letters Patent is set forth in the appended claim:

1. A counting, stacking and delivery mechanism for envelope-making machines comprising, conveyor means for delivering formed envelopes in [flat,] aligned spaced-apart relationship to rotary means for edge stacking the envelopes, said rotary means including a [pair] *plurality* of slotted positioning wheels adapted to receive the leading edge of envelopes from said conveyor means, means for counting individual envelopes as they are fed to said rotary means and for indicating the passage thereby of a predetermined number of envelopes, means responsive to said counting means for periodically transversely offsetting an envelope in the slotted area of said rotary means from the remainder of envelopes previously fed to said rotary means, and a substantially horizontal table *arranged* in [substantial alignment] *cooperating relationship* with said [conveyor] *rotary* means and having projecting tabs extending within said slotted area of said rotary means for receiving the envelopes for edge-stacking thereon, whereby the stacked envelopes upon said table are segregated into readily identifiable groups of envelopes of desired predetermined number, said last means including a spring biased plunger on one side of said rotary means and stop means on the other side of said rotary means to limit the amount of transverse offset imparted to an offset envelope.

References Cited

The following references, cited by the Examiner, are of record in the patented file of this patent or the original patent.

UNITED STATES PATENTS

| | | | |
|---|---|---|---|
| 1,681,162 | 8/1928 | Andersen | 93—93 |
| 2,364,324 | 12/1944 | Staude | 93—93 |
| 2,424,093 | 7/1947 | Harred | 93—93 |
| 2,551,685 | 5/1951 | McAleer et al. | 93—93 |
| 2,697,388 | 12/1954 | Hansen et al. | 93—93 |

BERNARD STICKNEY, *Primary Examiner.*

UNITED STATES PATENT OFFICE
CERTIFICATE OF CORRECTION

Reissue No. 26,348 February 20, 1968
Jack M. Ciccone, deceased, by Irene Ciccone, administrix It is hereby certified that error appears in the above numbered patent requiring correction and that the said Letters Patent should read as corrected below.

Column 4, after line 39, insert the following claims:

2. A counting, stacking and delivery mechanism for envelope-making machines comprising, conveyor means for delivery formed envelopes in aligned spaced-apart relationship to rotary means for edge stacking the envelopes, said rotary means including a plurality of slotted positioning wheels adapted to receive the leading edge of envelopes from said conveyor means, count determining means for indicating the passage thereby of a predetermined number of envelopes, means responsive to said count determining means for periodically transversely off-setting an envelope in the slotted area of said rotary means from the remainder of envelopes previously fed to said rotary means, and a substantially horizontal table arranged in cooperating relationship with said rotary means and having projecting tabs extending within said slotted area of said rotary means for receiving the envelopes for edge-stacking thereon, whereby the stacked envelopes upon said table are segregrated into readily identifiable groups of envelopes of desired predetermined number.

3. A counting, stacking and delivery mechanism for envelope-making machines comprising, conveyor means for delivering formed envelopes in aligned spaced-apart relationship to rotary means for edge stacking the envelopes, said rotary means including a plurality of slotted positioning wheels adapted to receive the leading edge of envelopes from said conveyor means, count determining means for indicating the passage thereby of a predetermined number of envelopes, means responsive to said count determining means for periodically offsetting an envelope in the slotted area of said rotary means from the remainder of envelopes previously fed to said rotary means, and a substantially horizontal table arranged in cooperating relationship with said rotary means and having projecting tabs extending within said slotted area of said rotary means for receiving the envelopes for edge-stacking thereon, whereby the stacked envelopes upon said table are segregated into readily identifiable groups of envelopes of desired predetermined number.

4. A counting, stacking and delivery mechanism for envelope-making machines comprising, conveyor means for delivering formed envelopes in aligned spaced-apart relationship to rotary means for edge stacking the envelopes, said rotary means including a plurality of slotted positioning wheels adapted to receive the leading edge of envelopes from said conveyor means, count determining means for indicating the passage thereby of a predetermined number of envelopes, means responsive to said count determining means for periodically offsetting an envelope in the slotted area of said rotary means from the remainder of envelopes previously fed to said rotary means, and a table arranged in cooperating relationship with said rotary means and having means positioned in proximity to the slotted area of said rotary means for receiving the envelopes for edge-stacking thereon, whereby the stacked envelopes upon said table are segregated into readily identifiable groups of envelopes of desired predetermined number.

in the heading to the printed specification, line 10, for "1 Claim." read -- 4 Claims. --.

Signed and sealed this 1st day of April 1969.

(SEAL)
Attest:

EDWARD M.FLETCHER,JR.
Attesting Officer

EDWARD J. BRENNER
Commissioner of Patents